(12) United States Patent
Frank et al.

(10) Patent No.: US 12,709,387 B2
(45) Date of Patent: Aug. 18, 2026

(54) VEHICLE WITH TRACTOR TILTROTORS AND PUSHER TILTROTORS

(71) Applicant: Kitty Hawk Corporation, Palo Alto, CA (US)

(72) Inventors: Evan E. Frank, Los Altos Hills, CA (US); Ananth Sridharan, Santa Clara, CA (US); Arthur Paul-Dubois-Taine, Scotts Valley, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 76 days.

(21) Appl. No.: 17/831,210

(22) Filed: Jun. 2, 2022

(65) Prior Publication Data

US 2022/0402603 A1 Dec. 22, 2022

Related U.S. Application Data

(60) Provisional application No. 63/213,439, filed on Jun. 22, 2021.

(51) Int. Cl.

| | |
|---|---|
| ***B64C 13/26*** | (2006.01) |
| ***B64C 11/30*** | (2006.01) |
| ***B64C 29/00*** | (2006.01) |
| ***B64D 27/31*** | (2024.01) |

(Continued)

(52) U.S. Cl.

CPC .......... *B64C 29/0033* (2013.01); *B64C 11/30* (2013.01); *B64C 13/26* (2013.01); *B64C 29/00* (2013.01); *B64D 27/31* (2024.01); *B64D 27/34* (2024.01); *B64D 27/402* (2024.01)

(58) Field of Classification Search

CPC ..... B64C 29/0033; B64C 13/26; B64C 11/30; B64D 27/26

See application file for complete search history.

(56) References Cited

U.S. PATENT DOCUMENTS

| | | | | |
|---|---|---|---|---|
| 3,089,666 | A | 5/1963 | Henry | |
| 10,513,341 | B2 * | 12/2019 | Jenkins ................ | G05D 1/0808 |
| 10,981,648 | B2 | 4/2021 | Sinha | |

(Continued)

FOREIGN PATENT DOCUMENTS

| | | |
|---|---|---|
| CN | 109606672 | 4/2019 |
| CN | 110650889 | 1/2020 |

OTHER PUBLICATIONS

Author Unknown, UK's Vertical Aerospace Unveils Designs for Pinoneering 'Flying Taxis', vertical-aerospace.com, Aug. 26, 2020, https://vertical-aerospace.com/uks-vertical-aerospace-unveils-designs-for-pinoneering-flying-taxis/.

(Continued)

*Primary Examiner* — Kimberly S Berona
*Assistant Examiner* — Steven J Shur
(74) *Attorney, Agent, or Firm* — Van Pelt, Yi & James LLP

(57) ABSTRACT

A vehicle includes a fuselage, a wing, a pylon that is coupled to the wing, and a tractor tiltrotor. The tractor tiltrotor is coupled to the pylon and is located forward of the wing; the tractor tiltrotor tilts upwards during a hover mode. There is also a pusher tiltrotor where the pusher tiltrotor is coupled to the pylon and is located aft of the wing; the pusher tiltrotor tilts downwards during the hover mode. The tractor tiltrotor and the pusher tiltrotor rotate about a longitudinal and coaxial axis of rotation in a cruise mode.

14 Claims, 8 Drawing Sheets

(51) Int. Cl.

| | |
|---|---|
| ***B64D 27/34*** | (2024.01) |
| ***B64D 27/40*** | (2024.01) |

(56) References Cited

U.S. PATENT DOCUMENTS

| | | | | |
|---|---|---|---|---|
| 2003/0094537 | A1 | 5/2003 | Austen-Brown | |
| 2011/0168835 | A1* | 7/2011 | Oliver | B64D 27/06 244/12.4 |
| 2018/0339770 | A1* | 11/2018 | Brunken | B64C 11/06 |
| 2019/0127061 | A1* | 5/2019 | McLaren | B64C 3/385 |
| 2019/0291860 | A1 | 9/2019 | Morgan | |
| 2019/0329882 | A1* | 10/2019 | Baity | B64U 30/14 |
| 2020/0023962 | A1* | 1/2020 | Fillingham | B64D 27/359 |
| 2020/0070970 | A1* | 3/2020 | Nilsen | B64C 1/1476 |
| 2020/0148347 | A1* | 5/2020 | Bevirt | B64D 27/24 |
| 2020/0164972 | A1 | 5/2020 | Kiesewetter | |
| 2020/0223542 | A1* | 7/2020 | Moore | B64C 9/00 |
| 2021/0107639 | A1 | 4/2021 | Hymer | |
| 2021/0107640 | A1 | 4/2021 | Baity | |
| 2021/0107642 | A1* | 4/2021 | Sinha | B60L 50/64 |
| 2021/0129980 | A1 | 5/2021 | Bartsch | |
| 2022/0127011 | A1* | 4/2022 | Long | B64D 27/24 |

OTHER PUBLICATIONS

Ed Garsten, Archer Aviation Unveils Electric Vertical Takeoff/ Landing Air Taxi, Forbes, Jun. 10, 2021, https://www.forbes.com/ sites/edgarsten/2021/06/10/archer-aviation-unveils-electric-vertical-takeofflanding-air-taxi.

Rob Verger, Joby's Electric Aircraft Inches US Closer to a Future Full of Flying Taxis, Popular Science, Mar. 31, 2021, https://www. popsci.com/story/technology/joby-aviation-electric-aircraft-air-taxi/.

* cited by examiner

VEHICLE WITH TRACTOR TILTROTORS AND PUSHER TILTROTORS

CROSS REFERENCE TO OTHER APPLICATIONS

This application claims priority to U.S. Provisional Patent Application No. 63/213,439 entitled EVTOL VEHICLE WITH TRACTOR TILTROTORS AND PUSHER TILTROTORS filed Jun. 22, 2021, which is incorporated herein by reference for all purposes.

BACKGROUND OF THE INVENTION

An attractive feature of a vertical takeoff and landing (VTOL) aircraft is that they can take off and land in a smaller footprint compared to conventional takeoff and landing (CTOL) aircraft. This makes VTOL aircraft usable away from airports or runways, such as in suburban or urban areas where the VTOL aircraft can use a park, parking lot, or rooftop to take off and land. Although some VTOL aircraft prototypes for suburban and/or urban environments have been developed, further improvements to such VTOL aircraft would be desirable to make them more widely adapted, commercially feasible, and/or easier to manufacture and/or certify.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a vehicle with one or more tractor tiltrotors and one or more pusher tiltrotors are described herein. As will be described in more detail below, the combination of tractor tiltrotors and pusher tiltrotors may be desirable because they provide better door access and/or reduce the cost and/or complexity associated with manufacturing. In some embodiments, the vehicle further includes a wing, such as a straight wing. Vehicles with straight wings may be less expensive to manufacture and/or easier to assemble compared to some other types of wings, such as forward-swept wings. This may be desirable in order to be a more commercially feasible vehicle. The following figure describes one embodiment of a process for providing a vehicle with one or more tractor tiltrotors and one or more pusher tiltrotors.

Figure 1:
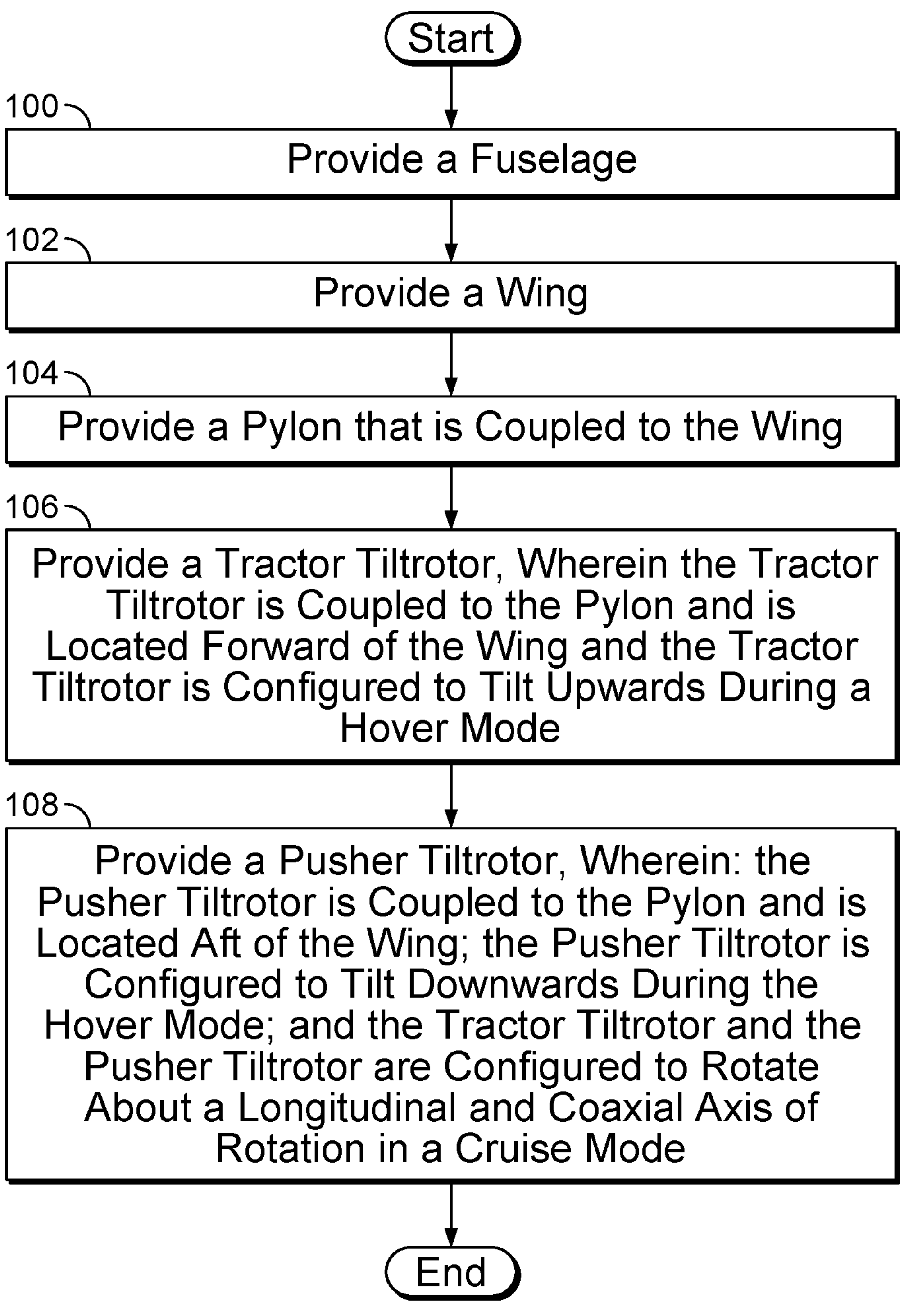
FIG. 1 is a flowchart illustrating an embodiment of a process to provide a vehicle with one or more tractor tiltrotors and one or more pusher tiltrotors.

FIG. 1 is a flowchart illustrating an embodiment of a process to provide a vehicle with one or more tractor tiltrotors and one or more pusher tiltrotors. In some embodiments, the process is performed by an electric vertical take-off and landing (eVTOL) aircraft.

At 100, a fuselage is provided. In one example application, the vehicle is intended to be a relatively low capacity people mover in a suburban or urban environment. To accommodate the relatively small takeoff and landing footprints in a suburban or urban environment, as well as the anticipated passenger counts, the fuselage in some embodiments includes a single seat or two seats for one or two occupants, respectively.

At 102, a wing is provided. In various embodiments, the wing is a straight wing, a tapered wing, and/or a forward-swept swing, etc. As will be described in more detail below, a straight wing may be desirable (e.g., compared to a forward-swept wing) for cost and/or ease of manufacturing and/or assembly.

At 104, a pylon that is coupled to the wing is provided. As will be described in more detail below, in some embodiments, the pylon runs parallel to a longitudinal or roll axis that runs from the nose to the tail of the fuselage; the wing, for reference, runs parallel to a transverse or pitch axis. In some embodiments, the wing is coupled to the roof or top surface of the fuselage so that the wing, pylons, and/or tiltrotors of the vehicle are above the doors of the vehicle and do not impede ingress or egress.

At 106, a tractor tiltrotor is provided, wherein the tractor tiltrotor is coupled to the pylon and is located forward of the wing and the tractor tiltrotor is configured to tilt upwards during a hover mode. Tractor tiltrotors are so named because a tractor tows or otherwise pulls a load that is located aft of the tractor and similarly a tractor tiltrotor tows or otherwise pulls a load (e.g., some portion of the vehicle's weight, attached via the pylon) that is located aft of the tractor tiltrotor.

At 108, a pusher tiltrotor is provided, wherein: the pusher tiltrotor is coupled to the pylon and is located aft of the wing; the pusher tiltrotor is configured to tilt downwards during the hover mode; and the tractor tiltrotor and the pusher tiltrotor are configured to rotate about a longitudinal and coaxial axis of rotation in a cruise mode. As implied by the name, a pusher tiltrotor pushes a load (e.g., some portion of the vehicle's weight, attached via the pylon) that is located forward of the pusher tiltrotor.

It may be helpful to show some embodiments of a vehicle that perform the process of FIG. 1. The following figure shows one such example.

Figure 2:
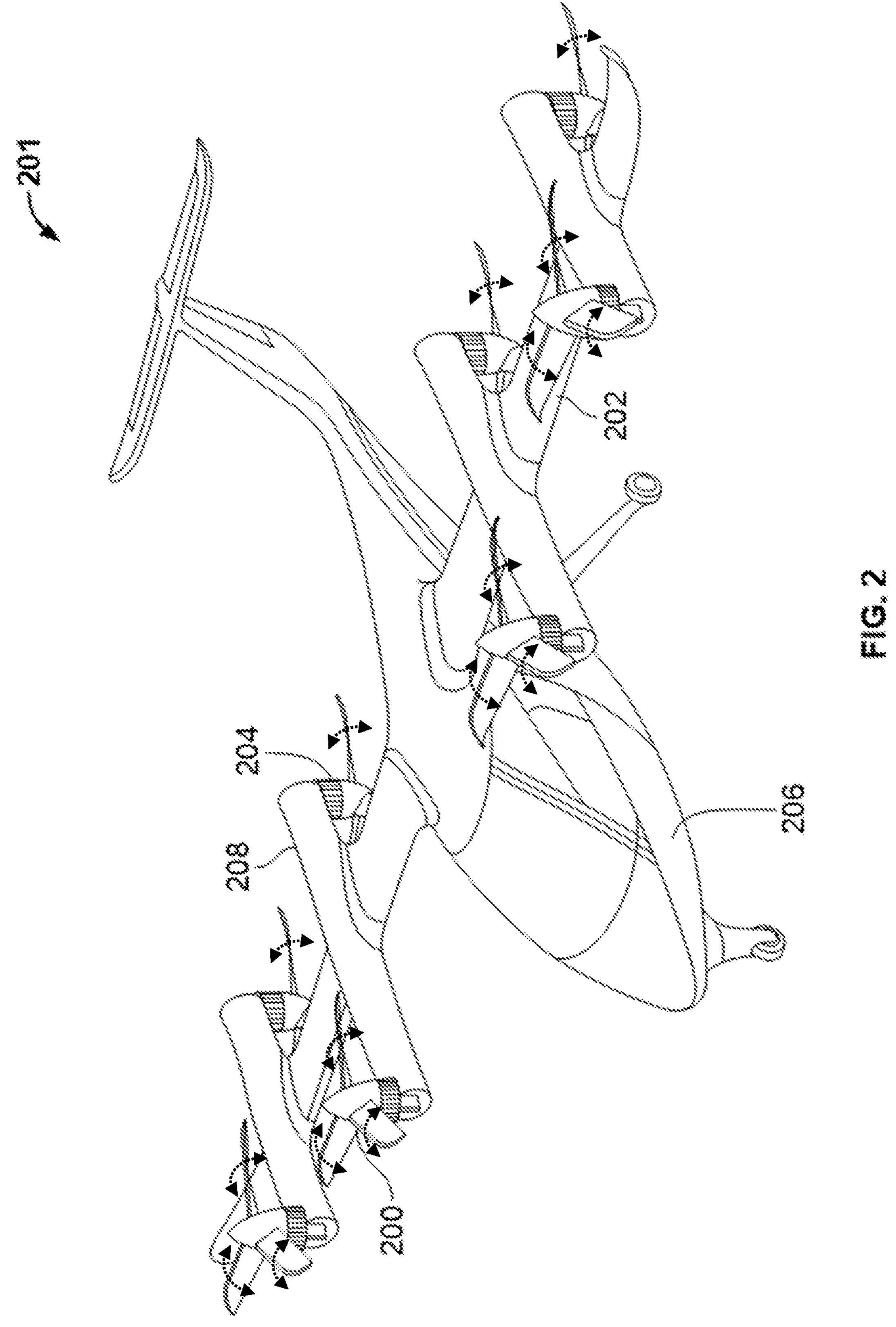
FIG. 2 is a front perspective-view diagram illustrating an embodiment of a vehicle with tractor tiltrotors and pusher tiltrotors.

FIG. 2 is a front perspective-view diagram illustrating an embodiment of a vehicle with tractor tiltrotors and pusher tiltrotors. In the example shown, the vehicle (201) is an eVTOL aircraft that includes four tractor tiltrotors (200) that are located forward of a main wing (202) and four pusher tiltrotors (204) located aft of the main wing (202). The forward, tractor tiltrotors (200) and aft, pusher tiltrotors (204) are co-axial and each tractor tiltrotor (200) shares a pylon (208) with a corresponding pusher tiltrotor (204).

In various embodiments, the (total) number of propellers (i.e., tiltrotors) is a multiple of four because there are an equal number of pylons on each side of the vehicle (in this example, two pylons on each side) and each pylon will have two propellers: a tractor tiltrotor and a pusher tiltrotor. The minimum number of propellers may be bounded or otherwise driven by failure mode and/or propeller out considerations. For example, suppose that the upper right propeller fails. To maintain balanced forces and moments, the corresponding lower left propeller is shut off. This leaves the upper left and lower right propellers producing at least double the thrust to hover, as well as additional thrust for maneuverability, etc. To support this failure scenario, the motors would need to be sized approximately three times as big. This degree of over-engineering for a failure scenario may be undesirable.

Another reason why four propellers may be undesirable for some applications is that to build an aircraft on the order of 500-1,000 kg that carries one to two passengers, relatively large propellers and/or tiltrotors would be required to get the appropriate disc area. However, the larger size would be detrimental (e.g., with respect to vibrations) during transition when the tiltrotors transition from the hover position to cruise position or vice versa.

In some applications, a practical consideration that limits the (total) number of propellers (i.e., tiltrotors) is related to weight and/or efficiency. For example, the vehicle shown here is a single or double occupant vehicle. For this type of application, weight-related metrics may be an important design consideration. In general, as the number of tiltrotors increases, the size of the motor in each tiltrotor decreases; as the size of the motor decreases, more (e.g., structural and/or stabilizing) material is required to manage the torque levels that will be experienced and/or generated by the smaller motors. The weight of the (smaller) motors then becomes a larger fraction of the total weight as the motors get smaller. To put it another way, when the motors are bigger, their specific torque (e.g., the torque associated with a single motor) is higher, which in some applications may encourage fewer tiltrotors for weight reasons.

For the reasons described above, an embodiment with 8, 12, or 16 (total) tiltrotors may be desirable in some applications. Having too few may be undesirable due to failure mode considerations and having too many may be undesirable for weight-related reasons.

To better understand the example vehicle shown here, it may be helpful to describe an example takeoff sequence. Prior to takeoff, the tractor tiltrotors (200) and pusher tiltrotors (204) would be in the hover position shown here. With the tractor tiltrotors (200) and pusher tiltrotors (204) facing down, the vehicle would take off vertically during a first stage of takeoff.

In the second stage of takeoff, the vehicle transitions from primarily vertical movement to primarily forward movement and as such this stage is sometimes referred to as a transitional stage. During this stage, the vehicle is moving both upwards (e.g., gaining altitude) and forwards and the tractor tiltrotors (200) would rotate from the upward-facing position (shown here in FIG. 2) to a forward-facing position (not shown) and the pusher tiltrotors (204) would rotate from a downward-facing position (shown in FIG. 2) to an aft-facing position (not shown). In other words, the tractor tiltrotors (200) and pusher tiltrotors (204) rotate from or otherwise between a hovering position to a forward flight or cruise position during the second, transitional stage of takeoff. The following figure shows an example of the tiltrotors in a cruise position.

Some eVTOL manufacturers do not have the tractor tiltrotors combined with pusher tiltrotors, possibly due to vibrations during the transitional stage. By having all of the rotors be tiltrotors (as shown here in FIG. 2), there will be more vibration on the rotors during the transitional stage, particularly when the tiltrotors are at a 45° angle. To address the vibration issue, the exemplary tractor tiltrotors and/or pusher tiltrotors shown here have a radius of 0.75 meters. In some embodiments, the tractor tiltrotors and/or pusher tiltrotors have a blade radius within a range of 0.7-2.5 m to keep vibrations to a tractable and/or manageable level. By addressing the vibration issue by appropriately sizing the tiltrotors, the example vehicle shown here is able to have more tiltrotors (e.g., compared to other manufacturers that have a combination of fixed rotors and tiltrotors), which is helpful for hover mode.

Another benefit of having tractor tiltrotors and pusher tiltrotors (see, e.g., FIG. 2) compared to some other configurations where the aft or trailing rotors are fixed rotors is that in those (other) configurations, the aft fixed rotor is stopped during hover mode (e.g., with the two propeller blades pointing forwards and backwards, parallel to the boom or pylon). This stopping feature adds additional design complexity and drag. In contrast, with tractor tiltrotors in combination with pusher tiltrotors, all of the tiltrotors (e.g., both tractor and pusher) can have the same tilting mechanism, if desired.

Another benefit associated with tractor tiltrotors in combination with pusher tiltrotors is that it offers better or more active control because both the leading set of rotors (i.e., the tractor tiltrotors) and the trailing set of tiltrotors (i.e., the pusher tiltrotors) are able to rotate. This enables better and/or more active tilt in positioning and/or control of the aircraft.

The following figure shows an example top view of a vehicle with one or more tractor tiltrotors and one or more pusher tiltrotors.

Figure 3:
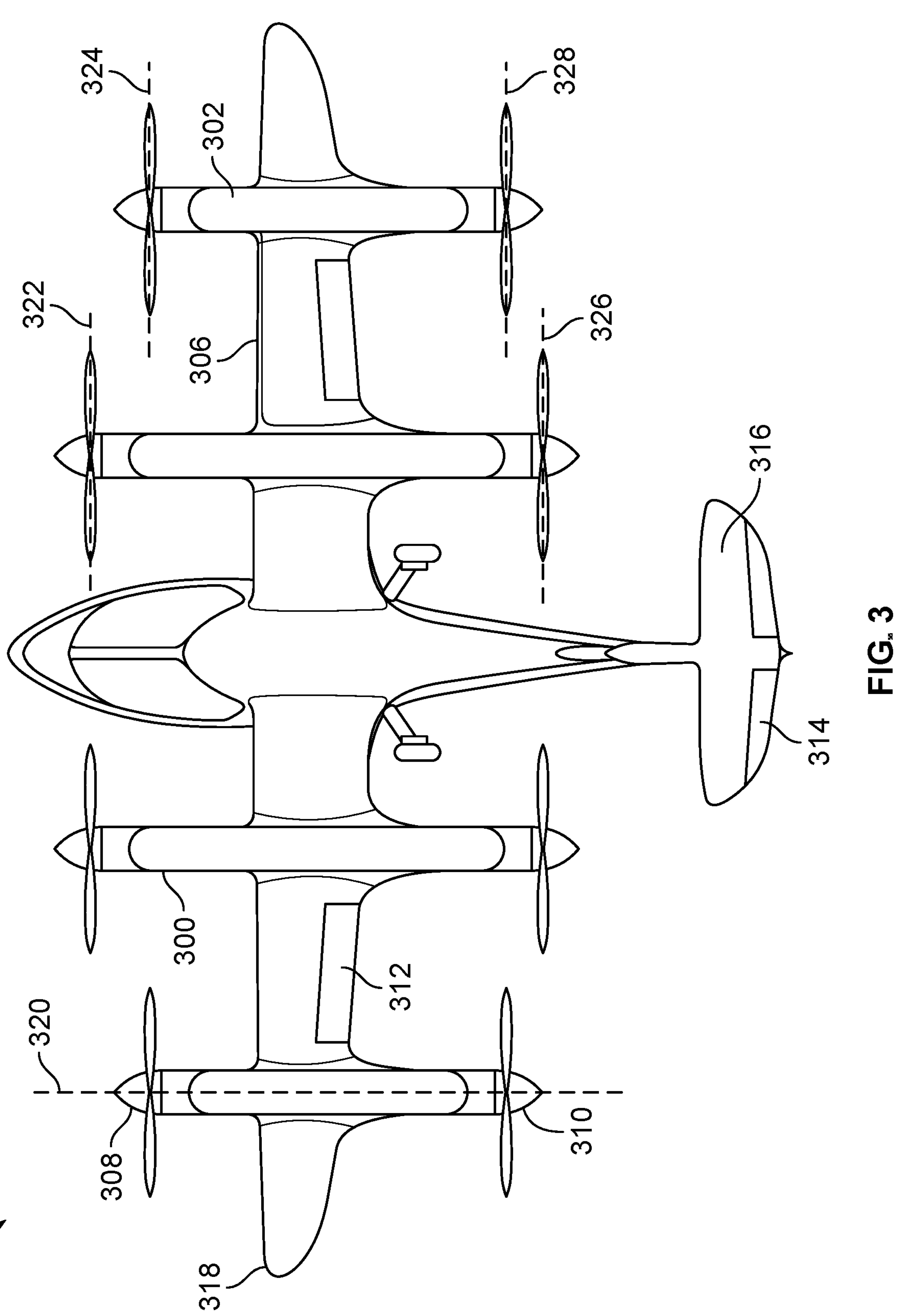
FIG. 3 is a top-view diagram illustrating an embodiment of an aircraft with tractor tiltrotors and pusher tiltrotors.

FIG. 3 is a top-view diagram illustrating an embodiment of an aircraft with tractor tiltrotors and pusher tiltrotors. In this example, the eVTOL vehicle (301) includes two inboard pylons (300) and two outboard pylons (302). Each pylon extends both forward and aft of the main wing (306) and is coupled to a forward, tractor tiltrotor (e.g., 308) and an aft, pusher tiltrotor (e.g., 310). In the state shown here, the forward, tractor tiltrotors (308) and aft, pusher tiltrotors (310) are in a cruise position (e.g., associated with forward flight at a substantially constant altitude). Returning briefly to FIG. 1, the longitudinal axis (320) shows an example of a longitudinal and coaxial axis of rotation (e.g., referred to at step 108 in FIG. 1) that tractor tiltrotor (308) and pusher tiltrotor (310) rotate about during a cruise mode or position.

Returning briefly to the takeoff example from above, in a third, forward flight stage of takeoff, the vehicle is flying at a constant altitude with primarily forward movement. In this stage, the tractor tiltrotors (308) and pusher tiltrotors (310) would be in a cruise position (as shown here in FIG. 3).

As shown from this top view, the main wing (306) is a straight wing, not a forward-swept wing. For example, this simplifies and speeds up the manufacturing process because a straight (main) wing can be manufactured from a single piece (e.g., of composite), making manufacturing and certification simpler and faster (e.g., compared to a forward-swept wing).

The control surfaces on the exemplary vehicle (301) include flaps and ailerons (312) on the main wing (306) and elevators (314) on the horizontal tail (316). The arrangement and/or placement of control surfaces (e.g., flaps, ailerons, elevators, etc.) shown here is merely exemplary and is not meant to be limiting.

The wing tips (318) of the exemplary vehicle (301) are curved to improve the aerodynamic performance of the vehicle by mitigating wingtip vortices. Some vehicles (e.g., an earlier version of the vehicle shown here) have a pylon located at the wingtip which prevents a curved wingtip (and its associated benefits) from being used. In contrast, in this vehicle (301), the outboard pylons (302) are not located at the wing tips (318), which permits the wing tips to be curved. To put this more generally, the vehicle shown here (301) has winglets.

As shown in this example, in some embodiments, the wing includes a straight and tapered wing, the tractor tiltrotor is an inboard tractor tiltrotor and the vehicle further includes an outboard tractor tiltrotor; the pusher tiltrotor is an inboard pusher tiltrotor and the vehicle further includes an outboard pusher tiltrotor; in the cruise mode, the inboard tractor tiltrotor and the outboard tractor tiltrotor rotate within different planes of rotation (see, e.g., planes of rotation 322 and 324); and in the cruise mode, the inboard pusher tiltrotor and the outboard pusher tiltrotor rotate within different planes of rotation (see, e.g., planes of rotation 326 and 328).

The following figure shows an example side view of a vehicle with one or more tractor tiltrotors and one or more pusher tiltrotors.

Figure 4:
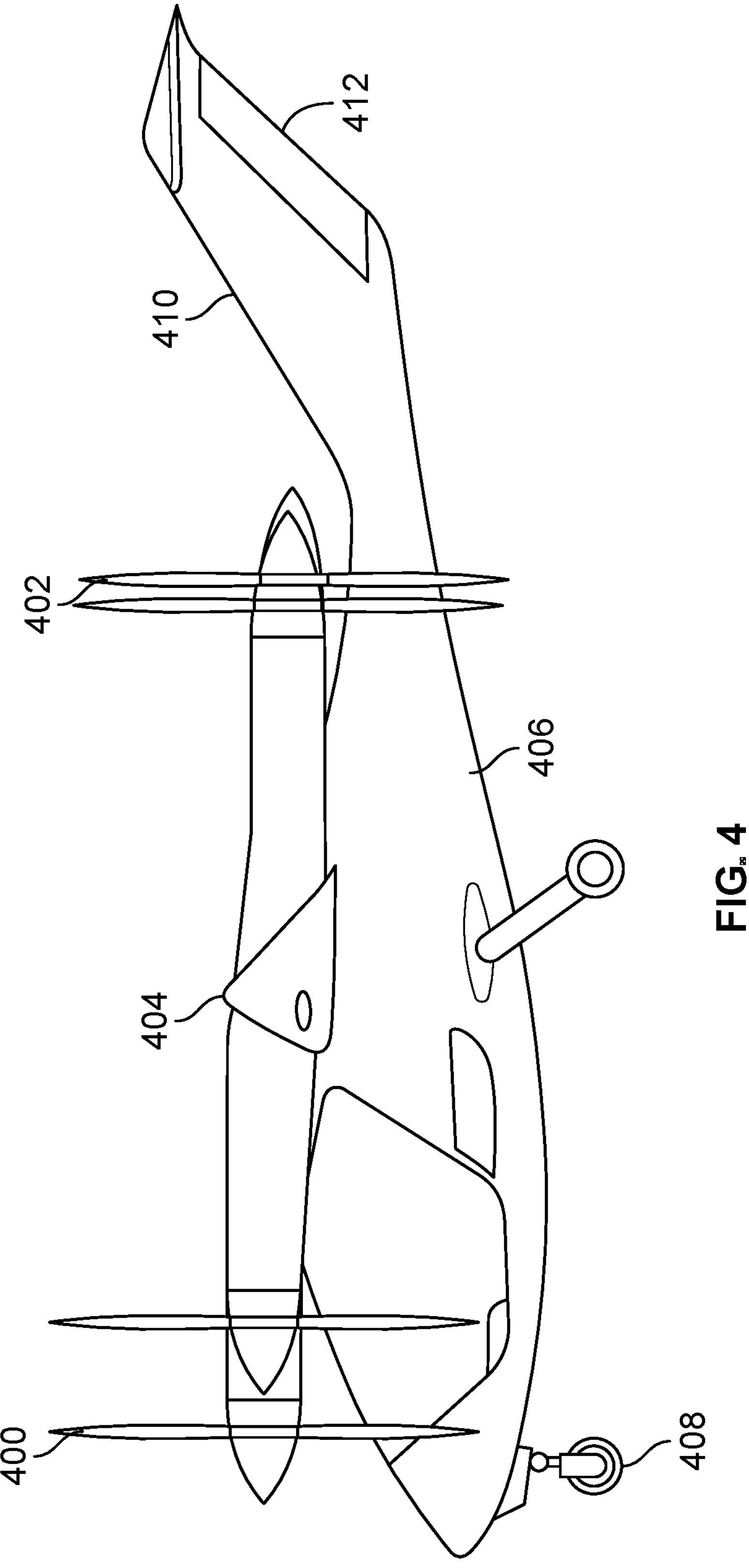
FIG. 4 is a side-view diagram illustrating an embodiment of an eVTOL aircraft with tractor tiltrotors and pusher tiltrotors.

FIG. 4 is a side-view diagram illustrating an embodiment of an eVTOL aircraft with tractor tiltrotors and pusher tiltrotors. In the state shown here, the forward, tractor tiltrotors (400) and aft, pusher tiltrotors (402) are in a cruise position (e.g., associated with forward flight at a substantially constant altitude). The main wing (404) is a high wing that is attached to the upper part of the fuselage (406). The batteries are located in the fuselage (406) behind the cockpit. Tricycle landing gear (408) is attached to the underside of the fuselage (406). The vertical tail (410) includes a rudder (412).

The following figure shows an example rear view of a vehicle with one or more tractor tiltrotors and one or more pusher tiltrotors.

Figure 5:
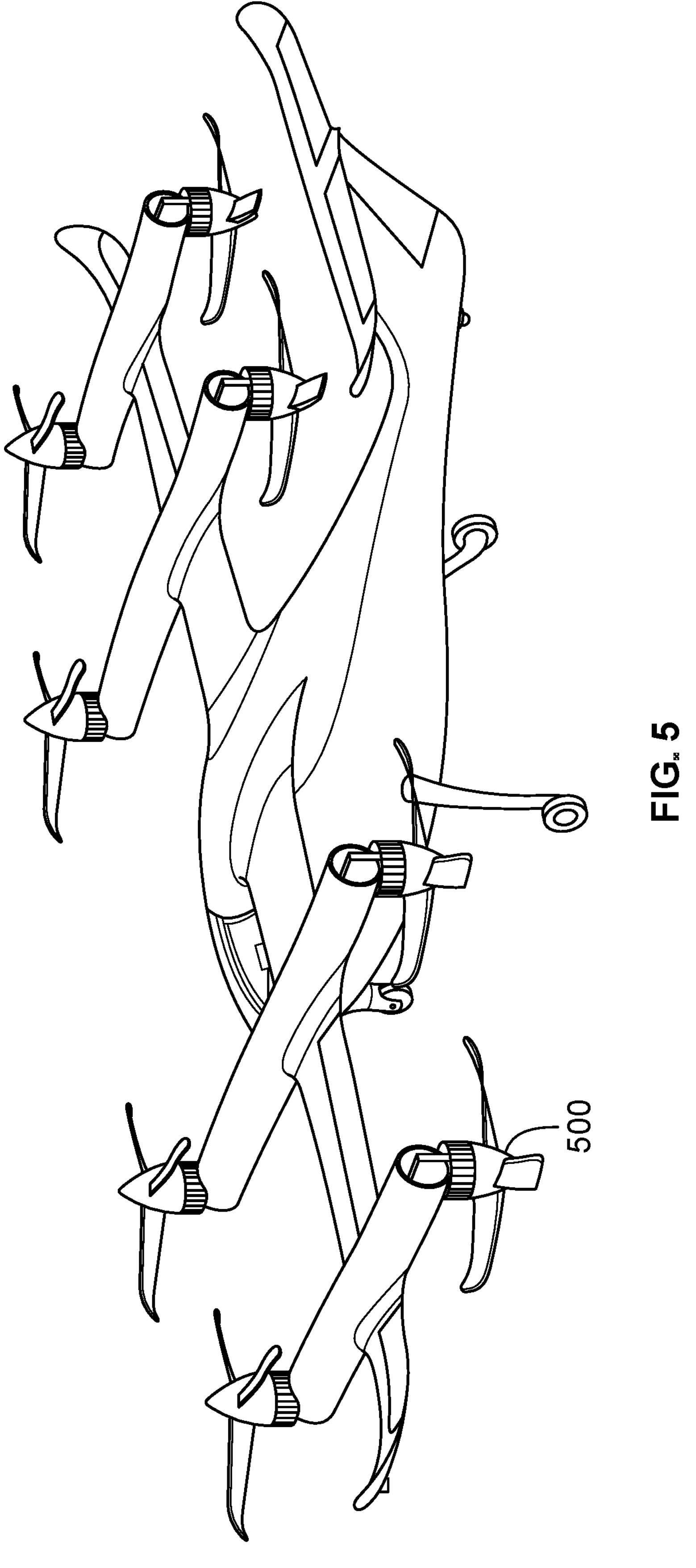
FIG. 5 is a rear perspective-view diagram illustrating an embodiment of a vehicle with tractor tiltrotors and pusher tiltrotors.

FIG. 5 is a rear perspective-view diagram illustrating an embodiment of a vehicle with tractor tiltrotors and pusher tiltrotors. From this angle, an unobstructed view of the pusher tiltrotors (500), which are in a cruise position in the state shown here, is provided.

To better describe some of the benefits associated with the example vehicle described above, it may be helpful to illustrate an older version of the vehicle. The following figure shows on example of this.

Figure 6:
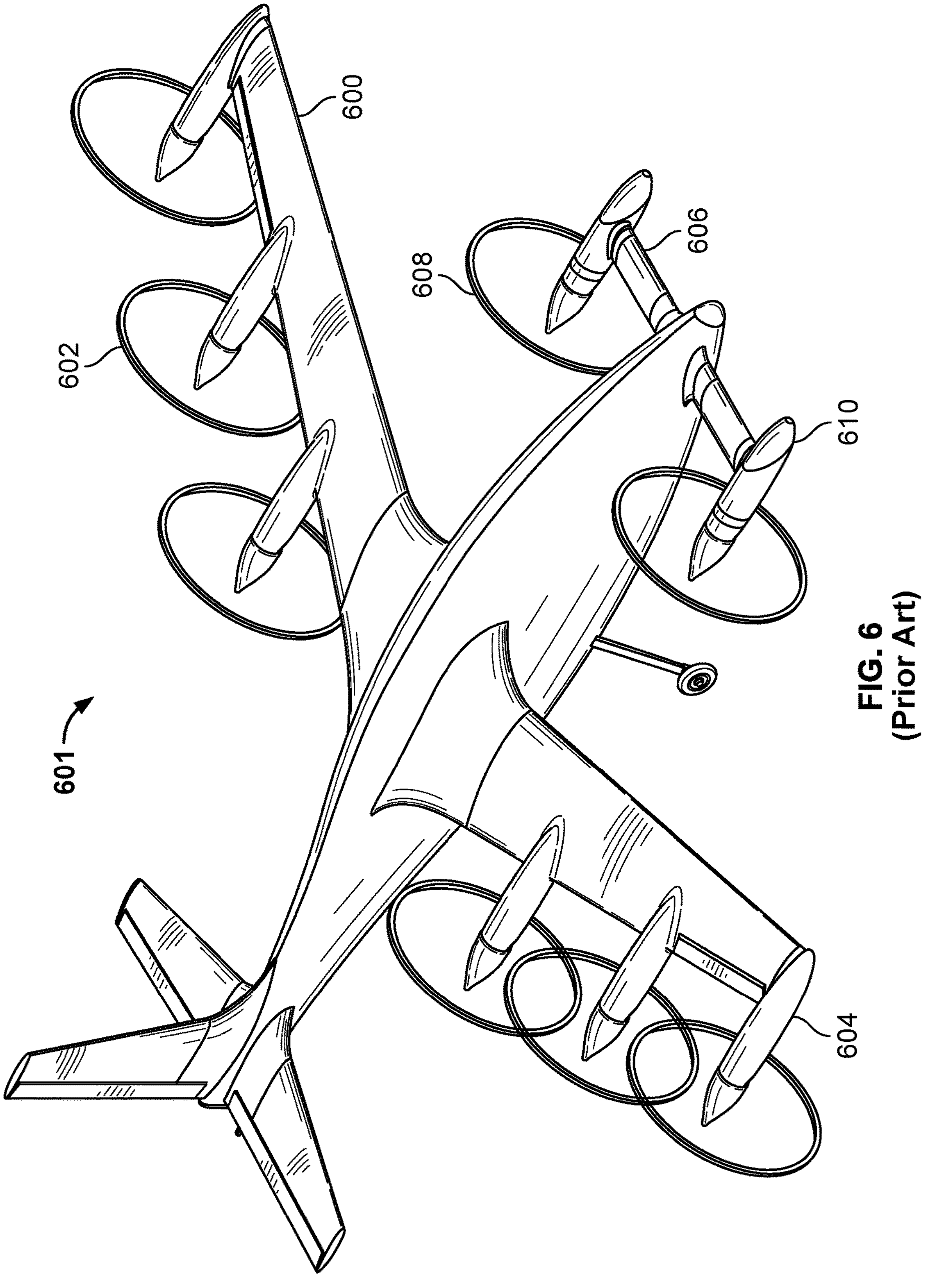
FIG. 6 is a diagram illustrating an earlier version of an aircraft with a forward-swept main wing and pusher tiltrotors.

FIG. 6 is a diagram illustrating an earlier version of an aircraft with a forward-swept main wing and pusher tiltrotors. In this example, the eVTOL aircraft (601) shown here is an earlier version of the vehicle with the tractor tiltrotors and pusher tiltrotors described above. In this example, the main wing (600) is forward swept and tapered. This vehicle has six (6) main wing tiltrotors (602) that are attached to the trailing edge of the main wing (600) via six (6) main wing pylons (604). It is noted that the main wing pylons (604) are coupled to the trailing edge of the main wing (600) and do not extend beyond the leading edge of the main wing (600). The vehicle also includes two canard tiltrotors (608) which are attached to the canard (606) via two canard pylons (610) attached to the distal ends of the canard (606).

Although the eVTOL aircraft shown here was sufficient for earlier-stage prototyping and development, further improvements to address certification by regulatory agencies (e.g., the Federal Aviation Administration), ease and/or speed of production of the vehicle on a large(r) scale, and/or occupant comfort (or, more generally, the flight experience) were desired.

Returning briefly to FIG. 2, a benefit to having the forward tiltrotors (200) be tractor-type tiltrotors is that it provides easier access to the door (206), making ingress and egress easier. If the forward tiltrotors (200) were instead pusher-type tiltrotors, then the downward-facing tiltrotors may block access to the door, making it more difficult for occupants and/or cargo to enter or exit the vehicle. The lack of canard tiltrotors and lack of a forward sweep in the main wing in that vehicle (201), the former which would be located near the door and the latter which would put the main wing closer to the door, also contribute to better ingress and egress. In addition to access considerations, eliminating the canard reduces manufacturing costs and simplifies the certification burden among other benefits. Likewise, a straight main wing reduces manufacturing costs and/or complexity compared to a forward-swept wing and may be desirable in more cost-sensitive applications. In contrast, the vehicle shown here (601) does have a canard (606), canard tiltrotors (608), and a forward-swept wing (600) with all of the associated drawbacks described above.

Returning briefly again to FIG. 2, the tractor tiltrotors (200) and pusher tiltrotors (204) shown there each have two actuators: one for tilt position and another for blade pitch position. In contrast, the vehicle shown here (601) has a coupled tilt position and blade pitch position so that for a given tilt position the blades could only be at one pitch angle. This decoupling of tilt position and blade pitch position is good for rejection of disturbances (e.g., during hover) and/or permits the use of smaller motors (e.g., so that the same maneuverability can be achieved using smaller motors). Similarly, being able to (independently) change the tilt position in hover permits more efficient flight and/or better maneuverability. In cruise mode, the ability to control or otherwise tune the blade pitch permits better efficiency (e.g., the blade pitch can better adapt to environmental conditions and/or real-time performance requirements).

To put it another way, in some embodiments, a tractor tiltrotor (and/or pusher tiltrotor) includes a first actuator associated with a tilt position of the tractor tiltrotor and a second actuator associated with a blade pitch position of the tractor tiltrotor, where the first actuator and the second actuator operate independently of each other.

The following figures show some centers of interest (e.g., aerodynamically) for exemplary wing configurations.

Figure 7:
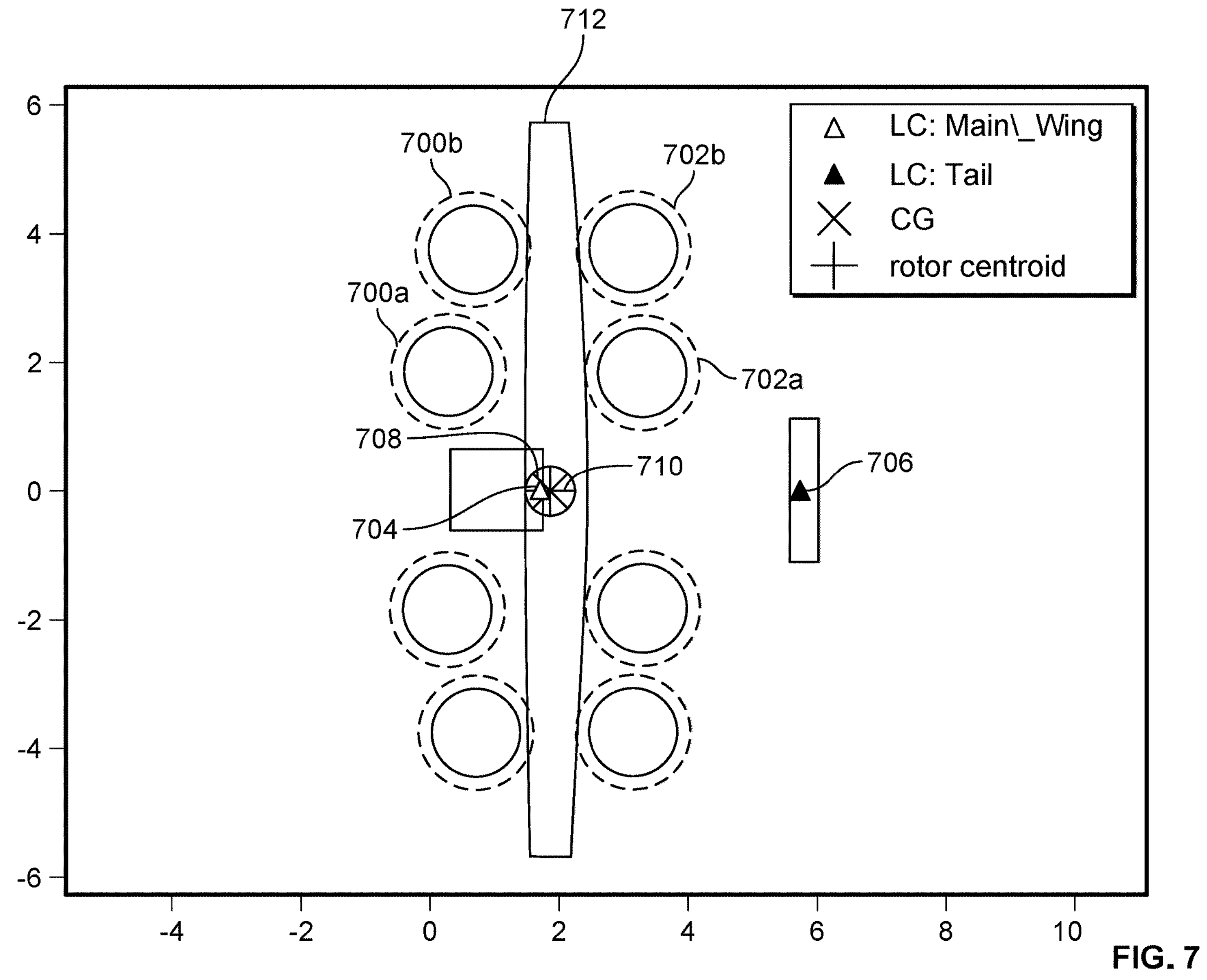
FIG. 7 is a diagram illustrating an embodiment of centers of interest for a vehicle with a tapered straight wing, tractor tiltrotors, and pusher tiltrotors.

FIG. 7 is a diagram illustrating an embodiment of centers of interest for a vehicle with a tapered straight wing, tractor tiltrotors, and pusher tiltrotors. In the example shown, various centers of interest (e.g., various centers of lift, the vehicle's center of gravity, and the rotor centroid) are shown when the vehicle's tractor tiltrotors (700*a* and 700*b*) and pusher tiltrotors (702*a* and 702*b*) are in a hover position. The lift center for the main wing (704) and lift center for the tail (706) are shown, for example, when the vehicle is flying in a forward flight mode. The wing (712) has a straight leading edge and a tapered trailing edge.

When the tiltrotors (700 and 702) are in the hover position (as shown here), the rotor centroid (710) also becomes the center of thrust. It is noted that the outboard tiltrotors (700*b* and 702*b*) are located closer to the wing (712) compared to the inboard tiltrotors (700*a* and 702*a*). Another way to describe this is that the inboard propellers are not aligned with the outboard propellers relative to or along the transverse or pitch axis of the aircraft (e.g., the outboard tractor tiltrotor (700*b*) is slightly behind or aft of the inboard tractor tiltrotor (700*a*)). For brevity and convenience, propellers and/or tiltrotors with this position or placement are sometimes referred to herein as unaligned propellers and/or tiltrotors.

A benefit of the illustrated position of the forward inboard propellers (e.g., 700*a*) is that if there is a propeller break, the occupant of the vehicle is outside of a blade throw angle; this test or consideration may be part of a certification process. The position of the aft inboard propellers (e.g., 702*a*) is driven by the position of the forward inboard propellers (e.g., 700*a*) and the desire to balance forces and moments, which promotes or otherwise results in a generally symmetric placement of the propellers.

It is noted that the vehicle's center of gravity (708) and the rotor centroid (i.e., the center of thrust) (710) are (substantially) the same and the main wing's center of lift (704) is slightly forward of those two centers. By having the lift center of the main wing (704) in front of the center of gravity (708) and the rotor centroid (710), the vehicle has longitudinal stability.

The following figure illustrates another embodiment with a different wing configuration and different propeller positions.

Figure 8:
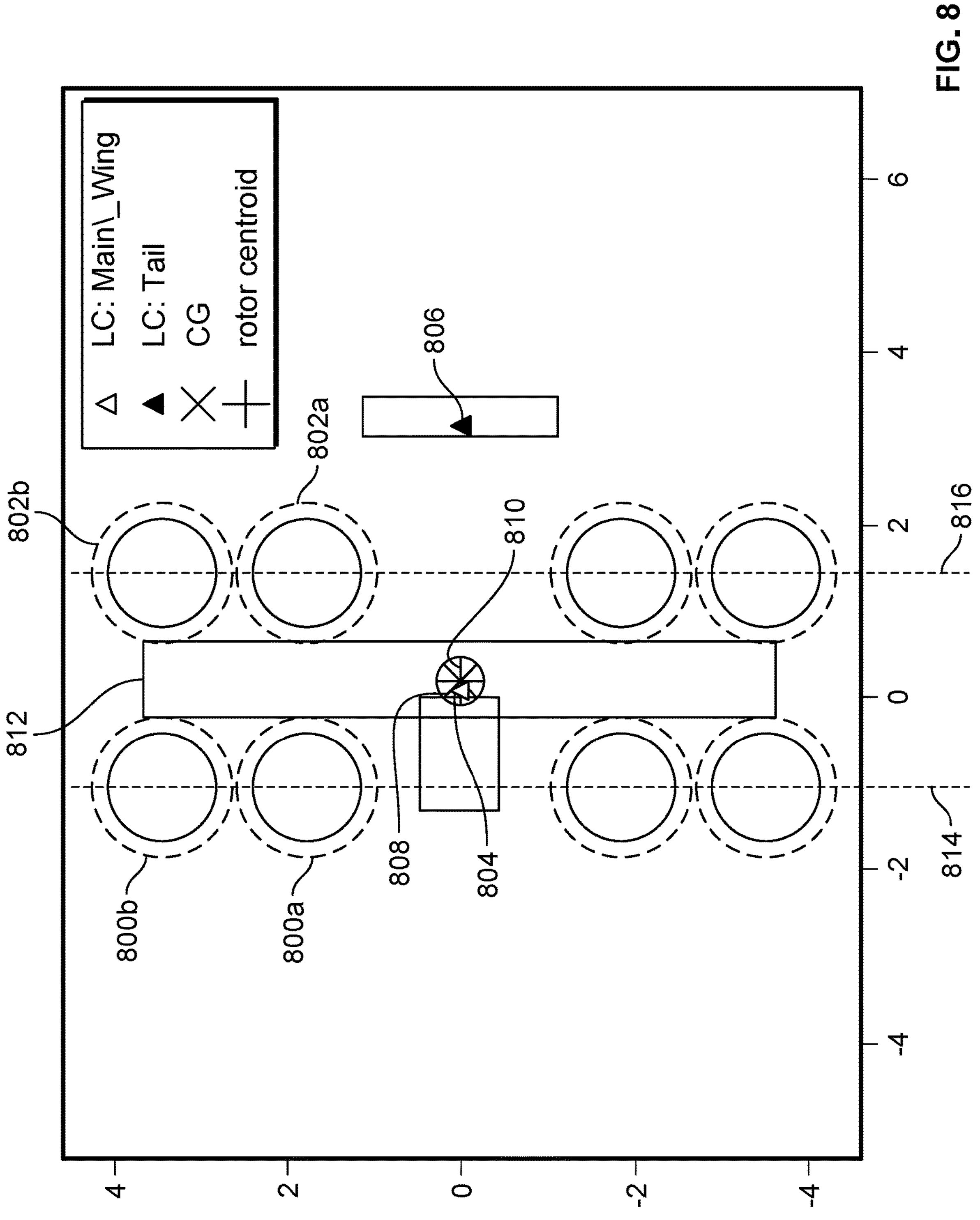
FIG. 8 is a diagram illustrating an embodiment of centers of interest for a vehicle with an untapered straight wing, tractor tiltrotors, and pusher tiltrotors.

FIG. 8 is a diagram illustrating an embodiment of centers of interest for a vehicle with an untapered straight wing, tractor tiltrotors, and pusher tiltrotors. In this example, the main wing's center of lift (804), tail's center of lift (806), center of gravity (808), and rotor centroid (810) are substantially the same as in the previous figure.

Unlike the previous figure however, the wing (812) in this example is an untapered straight wing with the outboard pylons (not shown) which are coupled to the outboard tiltrotors (e.g., 800*b* and 802*b*) located at the wing tip. This configuration further reduces the cost and/or complexity compared to the configuration shown in FIG. 7 because the rectangular shape of this wing (812) is even less expensive than the tapered straight wing (712) in FIG. 7. Depending upon the degree of price sensitivity, desired aerodynamic performance, and/or other design objectives, in some applications, the example of FIG. 7 may be preferred whereas in other applications the example of FIG. 8 may be preferred.

Another characteristic not illustrated by the previous figure is that the inboard tiltrotors (e.g., 800*a* and 802*a*) and the outboard tiltrotors (e.g., 800*b* and 802*b*) are aligned with each other. For example, if a line were drawn from the center of the inboard tractor tiltrotor (e.g., 800*a*) to the center of the outboard tractor tiltrotor (e.g., 800*b*), the resulting line would be parallel with the transverse or pitch axis of the vehicle. A benefit to this aligned arrangement of propellers (i.e., tiltrotors) is that the inboard pylons and the outboard pylons (not shown) can be identical (e.g., with the same length), reducing the number of unique parts that must be designed and manufactured to assemble a vehicle and/or simplifying maintenance.

Although FIG. 8 shows the propellers (i.e., tiltrotors in hover position), it can be extrapolated from this example that when in cruise mode, in some embodiments (as shown here), the wing includes a straight and untapered wing; the tractor tiltrotor is an inboard tractor tiltrotor and the vehicle further includes an outboard tractor tiltrotor; the pusher tiltrotor is an inboard pusher tiltrotor and the vehicle further includes an outboard pusher tiltrotor; in the cruise mode, the inboard tractor tiltrotor and the outboard tractor tiltrotor both rotate within a first plane of rotation (e.g., plane of rotation 814); and in the cruise mode, the inboard pusher tiltrotor and the outboard pusher tiltrotor both rotate within a second plane of rotation (e.g., plane of rotation 816).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A vehicle that has a center of gravity, comprising:

a fuselage;

a fixed wing that has a lift center;

a plurality of top-mounted pylons that is coupled to an upper surface of the fixed wing such that the plurality of top-mounted pylons protrudes above the upper surface of the fixed wing;

an inboard tractor tiltrotor and an outboard tractor tiltrotor, wherein:

the inboard tractor tiltrotor and the outboard tractor tiltrotor have a blade radius of 0.75 m to mitigate vibration during a transitional stage when the inboard tractor tiltrotor and the outboard tractor tiltrotor are mid-rotation;

the inboard tractor tiltrotor and the outboard tractor tiltrotor are respectively coupled to an inboard pylon and an outboard pylon in the plurality of top-mounted pylons;

the inboard pylon is longer than the outboard pylon;

the inboard tractor tiltrotor and the outboard tractor tiltrotor are located forward of the fixed wing;

the inboard tractor tiltrotor is located forward of the outboard tractor tiltrotor; and the inboard tractor tiltrotor and the outboard tractor tiltrotor are configured to tilt upwards during a hover mode;

an inboard pusher tiltrotor and an outboard pusher tiltrotor, wherein:

the inboard pusher tiltrotor and the outboard pusher tiltrotor have a blade radius of 0.75 m to mitigate vibration during the transitional stage when the inboard pusher tiltrotor and the outboard pusher tiltrotor are mid-rotation;

the inboard pusher tiltrotor and the outboard pusher tiltrotor are respectively coupled to the inboard pylon and the outboard pylon in the plurality of top-mounted pylons;

the inboard pusher tiltrotor and the outboard pusher tiltrotor are located aft of the fixed wing;

the inboard pusher tiltrotor is located aft of the outboard pusher tiltrotor;

the inboard pusher tiltrotor and the outboard pusher tiltrotor are configured to tilt downwards during the hover mode;

the inboard tractor tiltrotor and the inboard pusher tiltrotor are configured to rotate about a first longitudinal and coaxial axis of rotation in a cruise mode and the outboard tractor tiltrotor and the outboard pusher tiltrotor are configured to rotate about a second longitudinal and coaxial axis of rotation in the cruise mode;

during the hover mode, all of the inboard tractor tiltrotors, the outboard tractor tiltrotors, the inboard pusher tiltrotors, and the outboard pusher tiltrotors produce a rotor centroid; and the lift center of the fixed wing is forward of the center of gravity of the vehicle and the rotor centroid; and a plurality of tilt position actuators and a plurality of blade pitch position actuators, wherein:

each of the inboard tractor tiltrotor, the outboard tractor tiltrotor, the inboard pusher tiltrotor, and the outboard pusher tiltrotor include both (1) a tilt position actuator from the plurality of tilt position actuators and (2) a blade pitch position actuator from the plurality of blade pitch position actuators;

in the hover mode, each of the inboard tractor tiltrotor, the outboard tractor tiltrotor, the inboard pusher tiltrotor, and the outboard pusher tiltrotor are able to set their tilt position independent of their blade pitch position; and in the cruise mode, each of the inboard tractor tiltrotor, the outboard tractor tiltrotor, the inboard pusher tiltrotor, and the outboard pusher tiltrotor are able to set their blade pitch position independent of tilt position.

2. The vehicle recited in claim 1, wherein the vehicle includes an electric vertical take-off and landing (eVTOL) aircraft.

3. The vehicle recited in claim 1, wherein:

the fixed wing includes a straight, untapered, and fixed wing.

4. The vehicle recited in claim 1, wherein:

the vehicle has a total of eight tiltrotors, including: two inboard tractor tiltrotors, two outboard tractor tiltrotors, two inboard pusher tiltrotors, and two outboard pusher tiltrotors; and the fixed wing includes a winglet.

5. The vehicle recited in claim 1, wherein:

the vehicle has a total of four, and only four, top-mounted pylons; and the vehicle has a total of eight, and only eight, tiltrotors, including:

two, and only two, inboard tractor tiltrotors;

two, and only two, outboard tractor tiltrotors;

two, and only two, inboard pusher tiltrotors; and two, and only two, outboard pusher tiltrotors.

6. The vehicle recited in claim 1, wherein:

the inboard tractor tiltrotor and the outboard tractor tiltrotor have the blade radius of 0.75 m to mitigate vibration during the transitional stage when the inboard tractor tiltrotor and the outboard tractor tiltrotor are mid-rotation, specifically at 45°; and the inboard pusher tiltrotor and the outboard pusher tiltrotor have the blade radius of 0.75 m to mitigate vibration during the transitional stage when the inboard pusher tiltrotor and the outboard pusher tiltrotor are mid-rotation, specifically at 45°.

7. The vehicle recited in claim 1, wherein the fixed wing includes a straight leading edge and a tapered trailing edge.

8. A method, comprising:

providing a fuselage;

providing a fixed wing that has a lift center;

providing a plurality of top-mounted pylons that is coupled to an upper surface of the fixed wing such that the plurality of top-mounted pylons protrudes above the upper surface of the fixed wing;

providing an inboard tractor tiltrotor and an outboard tractor tiltrotor, wherein:

the inboard tractor tiltrotor and the outboard tractor tiltrotor have a blade radius of 0.75 m to mitigate vibration during a transitional stage when the inboard tractor tiltrotor and the outboard tractor tiltrotor are mid-rotation;

the inboard tractor tiltrotor and the outboard tractor tiltrotor are respectively coupled to an inboard pylon and an outboard pylon in the plurality of top-mounted pylons;

the inboard pylon is longer than the outboard pylon;

the inboard tractor tiltrotor and the outboard tractor tiltrotor are located forward of the fixed wing;

the inboard tractor tiltrotor is located forward of the outboard tractor tiltrotor; and the inboard tractor tiltrotor and the outboard tractor tiltrotor are configured to tilt upwards during a hover mode;

providing an inboard pusher tiltrotor and an outboard pusher tiltrotor, wherein:

the inboard pusher tiltrotor and the outboard pusher tiltrotor have a blade radius of 0.75 m to mitigate vibration during the transitional stage when the inboard pusher tiltrotor and the outboard pusher tiltrotor are mid-rotation;

the inboard pusher tiltrotor and the outboard pusher tiltrotor are respectively coupled to the inboard pylon and the outboard pylon in the plurality of top-mounted pylons;

the inboard pusher tiltrotor and the outboard pusher tiltrotor are located aft of the fixed wing;

the inboard pusher tiltrotor is located aft of the outboard pusher tiltrotor;

the inboard pusher tiltrotor and the outboard pusher tiltrotor are configured to tilt downwards during the hover mode;

the inboard tractor tiltrotor and the inboard pusher tiltrotor are configured to rotate about a first longitudinal and coaxial axis of rotation in a cruise mode and the outboard tractor tiltrotor and the outboard pusher tiltrotor are configured to rotate about a second longitudinal and coaxial axis of rotation in the cruise mode;

a vehicle that has a center of gravity includes the fuselage, the fixed wing, the plurality of top-mounted pylons, the inboard tractor tiltrotor, the outboard tractor tiltrotor, the inboard pusher tiltrotor, the outboard pusher tiltrotor, a plurality of tilt position actuators, and a plurality of blade pitch position actuators;

during the hover mode, all of the inboard tractor tiltrotors, the outboard tractor tiltrotors, the inboard pusher tiltrotors, and the outboard pusher tiltrotors produce a rotor centroid; and the lift center of the fixed wing is forward of the center of gravity of the vehicle and the rotor centroid; and providing the plurality of tilt position actuators and the plurality of blade pitch position actuators, wherein:

each of the inboard tractor tiltrotor, the outboard tractor tiltrotor, the inboard pusher tiltrotor, and the outboard pusher tiltrotor include both (1) a tilt position actuator from the plurality of tilt position actuators and (2) a blade pitch position actuator from the plurality of blade pitch position actuators;

in the hover mode, each of the inboard tractor tiltrotor, the outboard tractor tiltrotor, the inboard pusher tiltrotor, and the outboard pusher tiltrotor are able to set their tilt position independent of their blade pitch position; and in the cruise mode, each of the inboard tractor tiltrotor, the outboard tractor tiltrotor, the inboard pusher tiltrotor, and the outboard pusher tiltrotor are able to set their blade pitch position independent of tilt position.

9. The method recited in claim 8, wherein the method is performed by a vehicle that includes an electric vertical take-off and landing (eVTOL) aircraft.

10. The method recited in claim 8, wherein:

the fixed wing includes a straight, untapered, and fixed wing.

11. The method recited in claim 8, wherein:

the fuselage, the fixed wing, the plurality of top-mounted pylons, the inboard tractor tiltrotor, the outboard tractor tiltrotor, the inboard pusher tiltrotor, the outboard pusher tiltrotor, the plurality of tilt position actuators, and the plurality of blade pitch position actuators are included in a vehicle;

the vehicle has a total of eight tiltrotors, including: two inboard tractor tiltrotors, two outboard tractor tiltrotors, two inboard pusher tiltrotors, and two outboard pusher tiltrotors; and the fixed wing includes a winglet.

12. The method recited in claim 8, wherein:

the fuselage, the fixed wing, the plurality of top-mounted pylons, the inboard tractor tiltrotor, the outboard tractor tiltrotor, the inboard pusher tiltrotor, the outboard pusher tiltrotor, the plurality of tilt position actuators, and the plurality of blade pitch position actuators are included in a vehicle;

the vehicle has a total of four, and only four, top-mounted pylons; and the vehicle has a total of eight, and only eight, tiltrotors, including:

two, and only two, inboard tractor tiltrotors;

two, and only two, outboard tractor tiltrotors;

two, and only two, inboard pusher tiltrotors; and two, and only two, outboard pusher tiltrotors.

13. The method recited in claim 8, wherein:

the inboard tractor tiltrotor and the outboard tractor tiltrotor have the blade radius of 0.75 m to mitigate vibration during the transitional stage when the inboard tractor tiltrotor and the outboard tractor tiltrotor are mid-rotation, specifically at 45°; and the inboard pusher tiltrotor and the outboard pusher tiltrotor have the blade radius of 0.75 m to mitigate vibration during the transitional stage when the inboard pusher tiltrotor and the outboard pusher tiltrotor are mid-rotation, specifically at 45°.

14. The method recited in claim 8, wherein the fixed wing includes a straight leading edge and a tapered trailing edge.

* * * * *